United States Patent [19]

Brothers et al.

[11] 4,158,569
[45] Jun. 19, 1979

[54] FUSED REFRACTORY

[75] Inventors: Jack A. Brothers; Robert C. Doman, both of Painted Post; Robert N. McNally, Corning, all of N.Y.

[73] Assignee: Corning Glass Works, Corning, N.Y.

[21] Appl. No.: 922,826

[22] Filed: Jul. 10, 1978

[51] Int. Cl.$^2$ .................... C04B 35/10; C04B 35/12
[52] U.S. Cl. .................................................. 106/66
[58] Field of Search ........................................ 106/66

[56] References Cited

U.S. PATENT DOCUMENTS

| 2,063,154 | 12/1936 | Easter et al. | 106/66 |
| 2,279,260 | 4/1942 | Benner et al. | 106/66 |
| 2,911,313 | 11/1959 | Sandmeyer | 106/66 |

Primary Examiner—James Poer
Attorney, Agent, or Firm—Richard N. Wardell

[57] ABSTRACT

Dense fused cast product and fused grain product of material whose microstructure consists essentially of at least 70 volume % chrome-containing corundum solid solution crystal phase, at least about 5 volume % oxidic secondary crystal phases mainly comprising chrome-containing alkaline earth hexaluminate solid solution, and less than 10 volume % metal phase. Analytical composition of material, by weight, consists essentially of at least 90% $Al_2O_3+Cr_2O_3$, 20–60% $Cr_2O_3$, 1–4% MO where M is Ca, Ba, Sr, Mg, Fe and mixtures thereof, 0.4–3.5% CaO, BaO, SrO and mixtures thereof, not greater than 3% MgO, not greater than 3.5% FeO, <5% $SiO_2$, up to 0.5% fluorine, <1.5% $R_2O$ wherein R is Li, Na, K, Rb, Cs and mixtures thereof, up to 2% $TiO_2$ and up to 3% $ZrO_2$. Resistant to corrosion by soda-lime and borosilicate glasses. Notable electrical resistivity with $SiO_2$ <1% by weight.

6 Claims, No Drawings

FUSED REFRACTORY

BACKGROUND OF THE INVENTION

Heretofore commercial chrome-alumina fused refractory materials have generally comprised a two-phase crystal structure of chrome-containing corundum solid solution and chrome-alumina spinel solid solution with MgO and iron oxides. The earlier compositions as described in U.S. Pat. No. 2,063,154 emphasized the spinel solid solution. However, the later compositions of U.S. Pat. No. 2,279,260 limited the spinel solid solution by restricting the MgO and FeO contents as well as by small additions of $SiO_2$, $TiO_2$, $ZrO_2$ or $B_2O_3$. The latter compositions were the result of a study further reported by H. N. Baumann, Jr. in the Journal of the American Ceramic Society, Vol. 27, No. 11 (1944), pp. 327–329.

Those chrome-alumina fused refractory materials have been commercially employed in forming some structures for containing molten glasses, viz. those in which green coloration imparted by $Cr_2O_3$ dissolved from the refractory is not objectionable (e.g. some fibrous or wool glasses and some container glasses). In the English translation of his paper (Paper #20) presented at the Symposium On Refractory Materials for Glass-Melting Furnaces at the Research Laboratories of Pilkington Brothers, Ltd. in England during October 1964, M. Jaupain reported on experiments with several variations of chrome-alumina fused refractories, and he concluded that those with the least magnesia content (and the resultant least spinel phase) exhibited the greatest resistance to corrosion by sheet glass accompanied by negligible coloration of the glass. Nevertheless, commercial chrome-alumina fused refractories made during the past approximately fifteen years have customarily been in accordance with the corrosion and thermal shock resistant, balanced composition specified in U.S. Pat. No. 3,188,219, with about 3.7–7.3 wt.% MgO and about 2.7–4.9 wt.% iron oxide providing a minor spinel matrix as a second phase dispersed among the chrome-containing corundum solid solution phase.

Although the chrome-alumina fused refractories are inherently more resistant to corrosion by many glasses than are the common alumina-zirconia-silica (AZS) fused refractories and the common alumina fused refractories, their higher cost has often militated against their use in the past even where coloration of glass could be tolerated. With the conversion to electric melting and to higher production rates in furnaces producing glasses such as those for glass wool (e.g. thermal insulation for buildings) and glass containers where coloration is not objectionable, increased consumption rates of those other common fused refractories used therein began to cause serious concerns. As a consequence, it became economical to substitute the more corrosion resistant chrome-alumina fused refractories as well as the chrome-modified AZS fused refractory described in U.S. Pat. No. 3,837,870. Additionally, concerns of electrical energy loss through the refractory structure, with rather modest electrical resistivities at operating temperatures, sometimes could be alleviated by special changes in furnace designs, such as are illustrated by U.S. Pat. Nos. 3,806,621, 3,818,112 and 3,967,046, and by British patent specification 1,437,091. But despite these refractory substitutions and design changes, there has continued a real need for a refractory with even better corrosion resistance to the molten glasses and better electrical resistivity to avoid electrical energy losses, along with good thermal shock resistance.

As a preliminary part of our discovery of the present invention, we noted that it is not practically possible to simply eliminate magnesia and/or the spinel solid solution phase from the chrome-alumina fused compositions and thereby obtain increased corrosion resistance. That would result in a single phase mass of substantially elongated and mutually oriented chrome-containing corundum solid solution crystals associated with significant intergranular voids and planes of weakness contributing both poor thermal shock resistance and increased opportunity for corrosion by molten glass. Thus, we observed that the secondary phase is necessary for being able to maintain a finer grained, unoriented, denser crystal structure providing a chrome-alumina fused material with good strength, good thermal shock resistance and as little diminution as possible of corrosion resistance to molten glass contributed by the intrinsic character of the primary corundum solid solution.

The main problem that confronted us was finding a new fused refractory material of a chrome-alumina based composition with some new and/or modified secondary phase or phases that would coact with the corundum solid solution to provide significantly improved corrosion resistance to molten glass vis-a-vis prior chrome-alumina fused refractory materials. A further problem we faced was also finding some compositional modification that would yield notably higher electrical resistivity along with the enhanced corrosion resistance.

Among prior fused refractory materials with a primary corundum phase without chrome, a variety of oxidic secondary phases (besides zirconia in the AZS types) have been employed for various purposes (e.g. see U.S. Pat. Nos. 2,474,544–2,695,849–3,230,101–3,264,123–3,844,803–3,879,210). However, such collective knowledge did not provide any clear definitive guidance to the solution of the problems confronting us.

SUMMARY OF THE INVENTION

Our invention is the discovery of novel chrome-alumina fused refractory material with new specially balanced composition that provides oxidic secondary crystal phases comprising mainly chrome-containing alkaline earth metal hexaluminate solid solution that coact with the corundum solid solution primary crystal phase to yield greatly improved corrosion resistance to molten glasses, especially soda-lime and borosilicate glasses. In a further aspect of this invention, we have discovered that the novel fused refractory material will also possess superior electrical resistivity by restrictively controlling the $SiO_2$ content of the specially balanced composition.

In its broadest scope, the novel corrosion-resistant material of this invention has:

(a) a microstructure consisting essentially of at least 70 volume percent chrome-containing corundum solid solution crystal phase, at least about 5 volume percent oxidic secondary crystal phases mainly comprising chrome-containing alkaline earth metal hexaluminate solid solution, and less than 10 volume percent metal phase; and (b) an analytical composition, by weight, consisting essentially of at least 90% $Al_2O_3$ plus $Cr_2O_3$, 20–60% $Cr_2O_3$, 1–4% MO where M is Ca, Ba, Sr, Mg, Fe and mixtures thereof, 0.4–3.5% CaO, BaO, SrO and mixtures thereof, not greater than 3% MgO, not greater than 3.5% FeO, less than 5% $SiO_2$, up to 0.5% fluorine, less than 2.5% $R_2O$ where R is Li, Na, K, Rb, Cs and mixtures thereof, up to 2% $TiO_2$, and up to 3% $ZrO_2$.

The specially balanced composition involves several very important factors. The necessary proportioning of the MO oxides, collectively and individually as specified above, provides the very high volume amount of corundum solid solution phase (desirably at least 75 vol.%) that greatly contributes to the enhanced corrosion resistance of the material according to this invention. The critical amounts of alkaline earth oxides (viz. CaO, BaO and SrO, of which CaO is more commonly preferred) are necessary to provide sufficient amounts of their corresponding hexaluminate solid solution phase or phases while avoiding excessive amounts leading to formation of undesirable quantities of other phases detrimental to corrosion resistance (e.g. dicalcium aluminate). The MgO can be omitted or otherwise is strictly limited to minimize formation of spinel solid solution phase and the adverse effect on corrosion resistance. Carefully controlled FeO was found necessary to minimize formation of spinel solid solution, but it can be omitted. However, some experimental evidence suggests that at least about 0.5 wt.% FeO is desirable for reasonable thermal shock resistance. The maximum limit on $SiO_2$ is required in order to avoid significant undesirable silicate or glassy phase forming at the expense or in place of hexaluminate solid solution phase. A further restriction on $SiO_2$ to less than 1 wt.% provides the notably higher electrical resistivity of this invention. While $SiO_2$ may be omitted, manufacturing of the fused refractory material is facilitated by the presence of permissible small amounts thereof. The carefully proportioned $Cr_2O_3$ and $Al_2O_3$ contents make possible the essential primary corundum solid solution and secondary hexaluminate solid solution phases, which mainly govern the superior corrosion resistance of this invention. Other optional constituents may either be omitted or present within their respective controlled amounts so as not to deleteriously affect the desirable properties of this invention (especially corrosion resistance). However, in manufacturing fused cast products of this invention, at least about 0.02 wt.% fluorine (retained) is very beneficial to yielding such products with the last amount of cracks and spalls during manufacture. For producing fused grain, retained fluorine content is generally not needed.

A more desirable form of the invention is fused refractory material having:

(a) a microstructure consisting essentially of at least 75 volume percent chrome-containing corundum solid solution crystal phase, at least about 5 volume percent oxidic secondary crystal phases mainly comprising chrome-containing calcium hexaluminate solid solution, and less than 10 volume percent metal phase; and (b) an analytical composition, by weight, consisting essentially of at least 95% $Al_2O_3$ plus $Cr_2O_3$, 25–50% $Cr_2O_3$, 1–4% MO where M is Ca, Mg, Fe and mixtures thereof, 0.5–3% CaO, not greater than 1.5% MgO, 0.5–3% FeO, less than 1% $SiO_2$, up to 0.2% fluorine, less than 1% $R_2O$ where R is Li, Na, K and mixtures thereof, up to 1% $TiO_2$, and up to 3% $ZrO_2$.

An especially beneficial form of the invention is attained by modifying the material as described in the preceding paragraph to have: at least 80 volume percent corundum solid solution crystal phase, at least about 10 volume percent oxidic secondary crystal phases, less than 5 volume percent metal phase, at least 95 wt.% $Al_2O_3$ plus $Cr_2O_3$, 30–40 wt.% $Cr_2O_3$, 0.6–1 wt.% CaO, 0.4–0.8 wt.% MgO, 1–1.5 wt.% FeO, not greater than 0.3 wt.% $SiO_2$, 0.05–0.2 wt.% fluorine, less than 0.5 wt.% $R_2O$, not greater than 0.2 wt.% $TiO_2$ and up to 3 wt.% $ZrO_2$.

The fused refractory material of the invention can be in the form of either fused cast product (viz. blocks) or fused again product, including rebonded (sintered) fused grain product.

DETAILED DESCRIPTION

Conventional manufacturing procedures for fused grain and fused cast products are generally suitable for the present invention. The fused grain may be made by breaking up or atomizing a stream of the molten material or by crushing solidified masses of the material, either as fused cast product or as solidified in the melting furnace. The usual casting and annealing techniques are employed to form fused cast products. Pouring stream temperatures generally are maintained in the range of 2000°–2150° C., which temperatures ordinarily are better accomodated by graphite molds backed up by alumina annealing powder. Chrome-alumina fused materials have traditionally suffered from a tendency towards porosity formation in castings and the same is found in the present invention. However, that adverse condition, which tends to reduce inherent corrosion resistance, can be avoided or minimized by known techniques of maintaining relatively short melting arcs (e.g. less than 2 cm.) with relatively lower voltage, and of blowing oxidizing or inert gases, such as air oxygen, nitrous oxide, carbon dioxide, nitrogen or argon, into and/or onto the molten material during and/or after melting or casting. These gas treatment procedures are disclosed in Japanese Pat. No. 444,323 and U.S. Pat. No. 3,670,061. If the part of the $Cr_2O_3$ content is supplied by chrome ore, the porosity tendency therefrom may be overcome by precalcining the chrome ore in accordance with U.S. Pat. No. 2,911,313. Furthermore, the reducing effect of customary graphite electrodes of the electric melting furnaces in producing reduced metal phase in the fused refractory material can be counteracted by reoxidizing the molten material with the oxidizing gas blowing treatment as desired. That procedure minimizes chromium in the metal phase and maximizes the $Cr_2O_3$ content. Likewise, iron is generally kept as FeO, although some of it may be present as $Fe_2O_3$. In any event, the analytical composition limits are based on the assumption that all metal constituents present are in the oxide form indicated in the definition of such compositional limits.

Any suitable combinations of raw materials that provide the requisite analytical composition in the fused material according to our invention can be employed. Typical analyses (in weight percent) of commercially available, exemplary raw materials that we generally prefer are as follows:

Alumina—99.01% $Al_2O_3$, 0.45% $Na_2O$, 0.02% $SiO_2$;
Chromic Oxide—99.2% $Cr_2O_3$, 0.05% FeO, 0.01% $Al_2O_3$, 0.01% CaO, 0.01% $SiO_2$;
Chrome Ore—45.73% $Cr_2O_3$, 24.39% FeO, 14.60% $Al_2O_3$, 11.39% MgO, 2.00% $SiO_2$, 0.56% $TiO_2$, 0.29% CaO;
Fluorspar—95.24% $CaF_2$;
Lime—97.04% CaO, 1.48% $SiO_2$.

In batching the fluoride raw material, allowance has to be made for volatilization loss of fluorine. Our general experience with fluorspar is that about one-third of the batched fluorine content is retained in the fused material.

Of the following samples, all but Samples 5, 25 and 26 were made from about 57 kg. batch mixtures melted in an electric arc furnace with two hollow-graphite electrodes at 94–109 volts/120 KW with short arcs of about 2.6–12.8 mm. During melting, nitrogen gas was bubbled into the molten material at a rate of about 0.6 m$^3$/hr/electrode. At the end of melting and prior to casting, oxygen gas was blown into the melt for 30 seconds at a rate of about 5.9 m$^3$/hr. Thereafter, the melt was poured into molds yielding approximately 7.62×15.24×30.48 cm. castings.

Samples 25 and 26 were made from portions of an approximately one metric ton melt produced in an electric arc furnace with three hollow graphite electrodes at 120–180 volts/2200 KW with short arcs of about 9.5–19 mm. Nitrogen gas was blown into the melt during melting at a rate of about 1.1 m$^3$/hr/electrode. The melt was lanced with oxygen for five minutes at a rate of about 0.8 m$^3$/min. Then it was poured into molds yielding dense castings of various sizes and shapes. Sample 25 was taken from an approximately 0.9×0.3×0.4 m. casting, while Sample 26 was taken from an approximately 0.7×0.3×0.5 m. casting.

Sample 5 was taken from a block of commercially available fused cast refractory.

Table I compares a preferred embodiment of the present invention (Sample 1) with: (a) an approximate reproduction of material S-6 in Jaupain, supra (Sample 2), (b) an approximate reproduction of material S-5 in Jaupain, supra (Sample 3), (c) an approximate reproduction of the 2 wt.% MgO/5 wt.% FeO fused product described in claims 4 and 6 of U.S. Pat. No. 2,279,260 (Sample 4), and (d) a commercial product made in accordance with U.S. Pat. No. 3,188,219 (Sample /5). The phase analyses were obtained by conventional point count analyses. The data of molten glass corrosion melt line cut (MLC) were determined by the standard test procedure described in U.S. Pat. No. 3,632,359 at column 6, lines 3–16, but using molten AF "wool" glass produced by Owens-Corning Fiberglas Corporation and of the type described in U.S. Pat. Nos. 2,877,124 and 2,882,173. In the test, the temperature of the glass was 1450° C. and the duration of the test immersion was four days. These same test conditions were employed for obtaining all other MLC data in the succeeding tables.

TABLE I

| Sample No. | 1 | 2 | 3 | 4 | 5 |
|---|---|---|---|---|---|
| PHASE ANALYSIS[1] volume % | | | | | |
| Corundum ss. | 88.5 | 65.1 | 64.8 | 52.8 | 63.1 |
| Secondary oxidic | 11.3 | 33.6 | 34.6 | 42.3 | 36.5 |
| Hexaluminate ss. | 7.0 | — | — | — | — |
| Spinel ss. | 4.3 | 31.6 | 25–30[2] | 27.6 | 23.8 |
| Silicate | — | — | — | 14.7 | 8.9 |
| Uncertain oxidic | — | 2.0 | 5–10[2] | — | 3.8 |
| Metal | 3.2 | 1.3 | 0.6 | 4.9 | 0.4 |
| BATCH ANALYSIS[3] volume % | | | | | |
| $Al_2O_3$ | 64.67 | 35.64 | 69.70 | 62.49 | 60.65 |
| $Cr_2O_3$ | 32.22 | 61.11 | 25.39 | 29.80 | 27.37 |
| MO | 2.46 | 2.94 | 4.58 | 6.98 | 9.89 |
| CaO | 0.65 | 0.53 | 0.63 | 0.05 | — |
| MgO | 0.57 | 2.11 | 1.61 | 1.98 | 6.08 |
| FeO | 1.24 | 0.30 | 2.34 | 4.95 | 3.81 |
| $SiO_2$ | 0.13 | 0.03 | 0.03 | 0.36 | 1.78 |
| Fluorine | 0.20 | — | — | — | — |
| $Na_2O$ | 0.29 | 0.28 | 0.30 | 0.37 | 0.31 |
| $TiO_2$ | 0.03 | — | — | — | — |
| PROPERTIES | | | | | |
| % AP[4] | 2.2 | | | | 6.4 |
| MLC[5] mm × 10$^{-2}$ | 6.3 7 15 | 6.8 20 | 7.9 42 | 10 24 | 6.5 44 47 |

[1]Excludes pore volume.
[2]Best estimate due to reflectivity similarities.
[3]Similar to actual product chemical analyses, except for about two-thirds loss of fluorine (see Table 5). The analysis for Sample 5 is taken from producer's published literature.
[4]Apparent Porosity
[5]Melt line cut due to molten glass corrosion.

The importance of properly proportioning $Al_2O_3$ and $Cr_2O_3$ in this invention is illustrated in Table 2 wherein Samples 6–8 are not within the present invention while Samples 9–14 further illustrate the present invention.

TABLE 2

| Sample No. | 6 | 7 | 8 | 9 | 10 | 11 | 12 | 13 | 14 |
|---|---|---|---|---|---|---|---|---|---|
| BATCH ANALYSIS volume % | | | | | | | | | |
| $Al_2O_3$ | 87.08 | 84.28 | 77.41 | 69.58 | 64.67 | 64.67 | 59.78 | 48.64 | 45.04 |
| $Cr_2O_3$ | 9.74 | 12.26 | 19.44 | 27.23 | 32.22 | 32.22 | 37.21 | 48.33 | 52.21 |
| CaO | 0.64 | 0.84 | 0.64 | 0.71 | 0.65 | 0.65 | 0.61 | 0.64 | 0.46 |
| MgO | 0.57 | 0.57 | 0.57 | 0.57 | 0.57 | 0.57 | 0.57 | 0.57 | 0.57 |
| FeO | 1.22 | 1.23 | 1.23 | 1.24 | 1.24 | 1.24 | 1.24 | 1.24 | 1.23 |
| $SiO_2$ | 0.13 | 0.13 | 0.13 | 0.12 | 0.13 | 0.13 | 0.13 | 0.13 | 0.12 |
| Fluorine | 0.20 | 0.27 | 0.20 | 0.21 | 0.20 | 0.20 | 0.16 | 0.20 | 0.14 |
| $Na_2O$ | 0.39 | 0.39 | 0.35 | 0.31 | 0.29 | 0.29 | 0.27 | 0.22 | 0.20 |
| $TiO_2$ | 0.03 | 0.03 | 0.03 | 0.03 | 0.03 | 0.03 | 0.03 | 0.03 | 0.03 |
| PROPERTIES | | | | | | | | | |
| % AP | 15.5 | | 10.0 | | | 4.9 | | 11.5 | |
| MLC mm × 10$^{-2}$ | 15.3 120 139 | 1.4 74 | 8.0 91 78 | — 13 | 3.6 6 | 0.4 16 16 | — 7 | 12.5 8 7 | 5.5 16 |

Data set forth in Table 3 illustrates the need to avoid detrimental excessive amounts of CaO. All of the samples in this table except Sample 19 are within the present invention.

TABLE 3

| Sample No. | 15 | 16 | 17 | 18 | 19 |
|---|---|---|---|---|---|
| BATCH ANALYSIS weight % | | | | | |
| $Al_2O_3$ | 69.18 | 68.82 | 68.13 | 67.43 | 66.06 |
| $Cr_2O_3$ | 29.70 | 29.55 | 29.25 | 28.95 | 28.37 |
| CaO | 0.46 | 0.97 | 1.94 | 2.92 | 4.86 |
| FeO | 0.02 | 0.02 | 0.02 | 0.02 | 0.02 |
| $SiO_2$ | 0.02 | 0.02 | 0.04 | 0.06 | 0.08 |
| Fluorine | 0.31 | 0.31 | 0.31 | 0.31 | 0.31 |

TABLE 3-continued

| Sample No. | 15 | 16 | 17 | 18 | 19 |
|---|---|---|---|---|---|
| $Na_2O$ | 0.31 | 0.31 | 0.31 | 0.31 | 0.30 |
| PROPERTIES | | | | | |
| % AP | 0.04 | 4.5 | 5.9 | 0.9 | 4.5 |
|  | 0.3 | 4.6 | 7.2 | 0.6 | 4.3 |
| MLC mm | 18 | 29 | 34 | 40 | 76 |
| × $10^{-2}$ | 19 | 18 | 18 | 28 | 66 |

The effect of varying amounts of $SiO_2$ on corrosion resistance is illustrated by the data of Table 4. Samples 11 and 20–22 are within the present invention while Sample 23 is not within it.

TABLE 4

| Sample No. | 11 | 20 | 21 | 22 | 23 |
|---|---|---|---|---|---|
| BATCH ANALYSIS weight % | | | | | |
| $Al_2O_3$ | 64.67 | 64.62 | 64.55 | 63.34 | 61.43 |
| $Cr_2O_3$ | 32.22 | 32.18 | 32.15 | 31.57 | 30.60 |
| CaO | 0.65 | 0.64 | 0.64 | 0.62 | 0.61 |
| MgO | 0.57 | 0.57 | 0.57 | 0.56 | 0.55 |
| FeO | 1.24 | 1.24 | 1.24 | 1.23 | 1.18 |
| $SiO_2$ | 0.13 | 0.23 | 0.33 | 2.11 | 5.14 |
| Fluorine | 0.20 | 0.20 | 0.20 | 0.20 | 0.20 |
| $Na_2O$ | 0.29 | 0.29 | 0.29 | 0.35 | 0.27 |
| $TiO_2$ | 0.03 | 0.03 | 0.03 | 0.02 | 0.02 |
| PROPERTIES | | | | | |
| % AP | 4.9 | 5.8 | 5.0 | 5.4 | |
|  | 0.4 | 5.7 | 4.5 | 7.4 | 5.2 |
| MLC mm × $10^{-2}$ | 16 | 8 | 30 | 21 | |
|  | 16 | 16 | 24 | 21 | 112 |

Table 5 presents data illustrating the attainment of superior electrical resistivity by controlled low $SiO_2$ contents. Samples 24–26 are within the present invention whle Sample 5 is of a prior art commercial product as previously noted. Sample 24 had the same batch analysis as Samples 1, 10 and 11, and comparison of such batch analysis with the actual product chemical analysis of Sample 24 indicates how similar they are except for the normal amount of batched fluorine loss.

TABLE 5

| Sample No. | 24 | 25 | 26 | 5 |
|---|---|---|---|---|
| PRODUCT ANALYSIS weight % | | | | |
| $Al_2O_3$ | 65.8[1] | 61.50 | 62.65 | 60.65 |
| $Cr_2O_3$ | 31.0 | 33.08 | 31.09 | 27.37 |
| CaO | 0.79 | 0.76 | 0.80 | — |
| MgO | 0.71 | 0.57 | 0.69 | 6.08 |
| FeO | 1.61 | 1.51 | 1.68 | 3.81 |
| $SiO_2$ | 0.11 | 0.42 | 0.75 | 1.78 |
| Fluorine | 0.07 | 0.06 | 0.06 | — |
| $Na_2O$ | na[2] | 0.18 | 0.26 | 0.31 |
| $ZrO_2$ | — | 0.38 | 0.77 | — |
| Analytical Method | Wet | XRF[3] | XRF[3] | Unknown |
| ELECTRICAL RESISTIVITY ohm-cm. at indicated temperature | | | | |
| 1500° C. | 230 | 100 | 69 | 45 |
| 1400° C. | 500 | 180 | 170 | 54 |
| 1300° C. | 1100 | 320 | 290 | 63 |
| 1200° C. | 1800 | 680 | 700 | 91 |
| 1100° C. | 3500 | 1200 | 1200 | 180 |
| 1000° C. | 6300 | 2900 | 2000 | 430 |
| 500° C. | 250,000 | 180,000 | 110,000 | 25,000 |

[1]Determined by difference between 100% and sum of other constituents.
[2]Not analyzed.
[3]X-ray fluorescence.

To illustrate that small additions of $TiO_2$ can be tolerated within the present invention, Sample 27 was made with the following batch analysis by weight: 64.04% $Al_2O_3$, 31.90% $Cr_2O_3$, 0.64% CaO, 0.57% MgO, 1.24% FeO, 0.12% $SiO_2$, 0.20% fluorine, 0.29% $Na_2O$ and 1.00% $TiO_2$. Two specimens of Sample 27 exhibited the following properties:

| % AP | MLC mm × $10^{-2}$ |
|---|---|
| 4.9 | 8 |
| 5.9 | 14 |

As an illustration of a rebonded fused grain product within the present invention, some fused cast material from the same melt that produced Samples 25 and 26 was crushed and sized into a batch of three grain fractions as follows: 45 wt.% −4+10 Tyler mesh, 25 wt.% −10+45 Tyler mesh, 35 wt.% −100 Tyler mesh. To this grain batch was added (in amounts as percent of the grain batch) a binder of 2.75 wt.% lignin sulfonate (46.5 wt.% solids in water) and a lubricant of 1.15 wt.% polyethylene glycol solution (10 wt.% of trademarked product Carbowax 20 M in water). The well mixed batch ingredients were then pressed into brick that were fired at 1650° C. for six hours. Samples of the brick exhibited the following properties:

| % AP | MLC mm × $10^{-2}$ |
|---|---|
| 24.7 | 62 |
| 24.9 | 81 |

While rebonded fused grain products inherently contain greater porosity than fused cast products, it is believed that the foregoing properties of the illustrative rebonded fused grain product can be improved by appropriate particle sizing adjustments. Also, rebonded fused grain products of this invention may also be made with some portions of nonfused grain material, e.g. alumina or mixtures of alumina and chromic oxide as the −100 mesh fraction.

We claim:
1. Dense fused refractory material having
   (a) a microstructure consisting essentially of at least 70 volume percent chrome-containing corundum solid solution crystal phase, at least about 5 volume percent oxidic secondary crystal phases mainly comprising chrome-containing alkaline earth metal hexaluminate solid solution, and less than 10 volume percent metal phase; and
   (b) an analytical composition, by weight, consisting essentially of:
      at least 90% $Al_2O_3$ plus $Cr_2O_3$,
      20–60% $Cr_2O_3$,
      1–4% MO where M is Ca, Ba, Sr, Mg, Fe and mixtures thereof,
      0.4–3.5% CaO, BaO, SrO and mixtures thereof,
      not greater than 3% MgO, not greater than 3.5% FeO,
less than 5% $SiO_2$,
up to 0.5% fluorine,
less than 1.5% $R_2O$ where R is Li, Na, K, Rb, Cs and mixtures thereof,
up to 2% $TiO_2$, and
up to 3% $ZrO_2$.

2. Material of claim 1 in the form of fused cast product and wherein the analytical content of fluorine is at least 0.02%.

3. Material of claims 1 or 2 further having
   (a) a microstructure wherein the corundum solid solution crystal phase is at least 75 volume percent and the hexaluminate solid solution phase is based on calcium; and
   (b) an analytical composition wherein:
   $Al_2O_3$ plus $Cr_2O_3$ is at least 95%,
   $Cr_2O_3$ is 25–50%,
   CaO is 0.5–3%,
   MgO is not greater than 1.5%,
   FeO is 0.5–3%,
   $SiO_2$ is less than 1%,
   fluorine is not greater than 0.2%,
   $R_2O$ is less than 1%, and
   $TiO_2$ is not greater than 1%.

4. Material of claims 1 or 2 further having
   (a) a microstructure wherein the corundum solid solution crystal phase is at least 80 volume percent, the oxidic secondary crystal phases are at least about 10 volume percent, and the metal phase is less than 5 volume percent; and
   (b) an analytical composition wherein:
   $Al_2O_3$ plus $Cr_2O_3$ is at least 95%,
   $Cr_2O_3$ is 30–40%,
   CaO is 0.6–1%,
   MgO is 0.4–0.8%,
   FeO is 1–1.5%,
   $SiO_2$ is not greater than 0.3%,
   fluorine is 0.05–0.2%,
   $R_2O$ is less than 0.5%, and
   $TiO_2$ is not greater than 0.2%.

5. Material of claim 1 in the form of fused grain.

6. Fused grain of claim 5 in the form of rebonded fused grain product.

* * * * *

UNITED STATES PATENT AND TRADEMARK OFFICE
CERTIFICATE OF CORRECTION

PATENT NO. : 4,158,569

DATED : June 19, 1979

INVENTOR(S) : Jack A. Brothers, Robert C. Doman, Robert N. McNally

It is certified that error appears in the above-identified patent and that said Letters Patent are hereby corrected as shown below:

Column 3, line 2, change "2.5%" to -- 1.5% -- .

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*